US 6,557,063 B1

(12) United States Patent
Wang et al.

(10) Patent No.: US 6,557,063 B1
(45) Date of Patent: Apr. 29, 2003

(54) POWER CONSERVATION WITH A SYNCHRONOUS MASTER-SLAVE SERIAL DATA BUS

(75) Inventors: Wei Wang, New York, NY (US); Victor Marten, New York, NY (US); Ioannis Milios, New York, NY (US)

(73) Assignee: Semtech Corporation, Newbury Park, CA (US)

( * ) Notice: Subject to any disclaimer, the term of this patent is extended or adjusted under 35 U.S.C. 154(b) by 0 days.

(21) Appl. No.: 09/868,294

(22) PCT Filed: Feb. 16, 2000

(86) PCT No.: PCT/US00/03958

§ 371 (c)(1), (2), (4) Date: Jun. 4, 2002

(87) PCT Pub. No.: WO00/51281

PCT Pub. Date: Aug. 31, 2000

Related U.S. Application Data

(60) Provisional application No. 60/121,913, filed on Feb. 26, 1999.

(51) Int. Cl.$^7$ .............................................. G06F 13/00
(52) U.S. Cl. ...................... 710/110; 713/322; 713/600
(58) Field of Search .................... 713/320, 322, 713/323, 324, 600, 601; 710/110, 105; 326/86

(56) References Cited

U.S. PATENT DOCUMENTS

| | | | |
|---|---|---|---|
| 4,293,927 A | | 10/1981 | Hoshii |
| 5,560,001 A | * | 9/1996 | Kardach et al. ............ 713/500 |
| 5,585,792 A | | 12/1996 | Liu et al. |
| 5,625,807 A | * | 4/1997 | Lee et al. .................... 713/601 |
| 5,841,996 A | | 11/1998 | Nolan et al. |
| 5,898,879 A | * | 4/1999 | Kim .......................... 713/322 |
| 6,021,506 A | * | 2/2000 | Cho et al. ................... 713/601 |
| 6,438,699 B1 | * | 8/2002 | Cato et al. .................. 713/323 |

* cited by examiner

Primary Examiner—Glenn A. Auve
Assistant Examiner—X. Chung-Trans
(74) Attorney, Agent, or Firm—Oppedahl & Larson LLP

(57) ABSTRACT

A system is described in which the Master can stop its clock and go into a low-power state (for power conservation reasons) at arbitrary times. Before going into the stopped-clock or low-power mode, the Master checks that the serial bus is idle (defined as both Clock and Data lines being "High"). A latch circuit is provided which is active when them aster is in low-power mode. The latch circuit watches for the very first negative-going clock pulse (from the slave), and its configuration is such that when latched, it holds the clock line low. Holding the clock line low prompts the slave to discontinue efforts to send the data. Stated differently, the slave will not conclude that it had successfully sent its data, and this prompts the slave to retain a copy of its data for later resending.

15 Claims, 3 Drawing Sheets

POWER CONSERVATION WITH A SYNCHRONOUS MASTER-SLAVE SERIAL DATA BUS

This application claims the benefit of provisional application 60/121,913 filed Feb. 26, 1999.

The invention relates generally to serial bus communication between two devices, and relates more particularly to synchronous communication established so as to permit effective power conservation in the system.

BACKGROUND

In recent years much attention has been paid to power conservation in personal electronic devices including personal computers. Among the design goals is the provision of the greatest possible battery life. Efforts to make computers smaller have led to pressure to make the battery smaller, which leads to a battery of lesser capacity and thus works against the provision of longer battery life. There is also an upward pressure on the speed of the processor, and as a general matter faster processors consume more power. It is thus a daunting task to provide satisfactory battery life, and every possible area of power savings has to be investigated and considered. Wherever any two system components connect, for example at two ends of a cable or communications channel, it is desirable to design each of the two components so that the manner of their interaction favors the efforts to reduce power consumption (and thus the efforts to maximize battery life).

In the area of user input devices such as keyboards and pointing devices, however, the designer of a computer system does not have the luxury of designing the components at both ends of the cable, for the simple reason that the keyboard or mouse is of a fixed design, conforming to a fixed interface specification. The computer system may be purchased by the consumer in one store and the external keyboard or mouse in another store.

Those skilled in the art, faced with the goal of conserving power, find that many measures can contribute to that goal, among them the measure of putting electronics "to sleep" when they are not needed. Alternatively, a productive measure is to cause an item of electronics to run at a slow clock rate most of the time and to run the item at its full clock rate only when absolutely necessary. For example, in the case of circuitry that responds to user inputs at a keyboard, it may be desired to allow the circuitry to go to sleep between keystrokes, or to allow it to reduce its clock speed drastically between keystrokes. Similarly in the case of circuitry that responds to user inputs at a mouse or other pointing device, it may be desirable to allow the circuitry to go to sleep or to run slowly between pointing device inputs.

As discussed above, in the case where the system designer is able to design the keyboard or pointing device, any number of techniques may be used to permit such power conservation. One such technique is described in U.S. Pat. No. 5,585,792, assigned to the same assignee as the assignee of the present invention. But in cases where nothing is known about the user input device other than that it conforms to a historical standard such as the PS/2 standard discussed herein, then power conservation is much more difficult. For example, if a system (or part of a system such as a user input device interface) goes "to sleep" or slows its clock rate substantially, the question arises what will happen when a user presses a key or moves a pointing device. With most commercially available keyboards and pointing devices, what happens is that a scancode is generated by the user input device. The scancode is communicated via a synchronous serial data line to the user input device interface, and the expectation is that the interface will receive the scancode and pass it along to the operating system via a BIOS (basic input/output system). The difficulty arises that it takes some non-zero interval of time for the system to "wake up". During this interval, the entirety of the scancode will have come and gone. The practical effort of this is that the keystroke or pointing device movement is lost. From the user's point of view, this tradeoff is quite unacceptable—even if power is to be saved, the user will not tolerate lost keystrokes.

In some system, the effort to conserve power leads to a system in which the interface for the user input devices (e.g. a keyboard controller or pointing device controller) will quite literally go to sleep between all keystrokes. It awakens long enough to process one scancode, and then goes back to sleep until the next scancode. But in such a system, if the time required for awakening of the controller were to lead to the loss of a scancode, the practical result would be that all scancodes are lost. This is quite unworkable.

There is thus a great need for an approach according to which a personal electronic system such as a person computer, or a user input interface for such a system, may transition to a low-power mode between user inputs, and may transition to a full-power mode to handle user inputs, without loss of user input information, and to accomplish these results even with the use of user input devices about which nothing is known other than their compliance with historical interface specifications.

SUMMARY OF THE INVENTION

A system is described in which the Master can stop its clock and go into a low-power state (for power conservation reasons) at arbitrary times. Before going into the stopped-clock or low-power mode, the Master checks that the serial bus is idle (defined as both Clock and Data lines being "High"). A latch circuit is provided which is active when the master is in low-power mode. A latch circuit watches for the very first negative-going clock pulse (from the slave), and its configuration is such that when latched, it holds the clock line low. Holding the clock line low prompts the slave to discontinue efforts to send the data. Stated differently, the slave will not conclude that it had successfully sent its data, and this prompts the slave to retain a copy of its data for later resending.

DESCRIPTION OF THE DRAWINGS

The invention will be described with respect to a drawing in several figures, of which.

Where possible, like reference numerals have been given to like elements in the figures.

DETAILED DESCRIPTION

Figure 1:
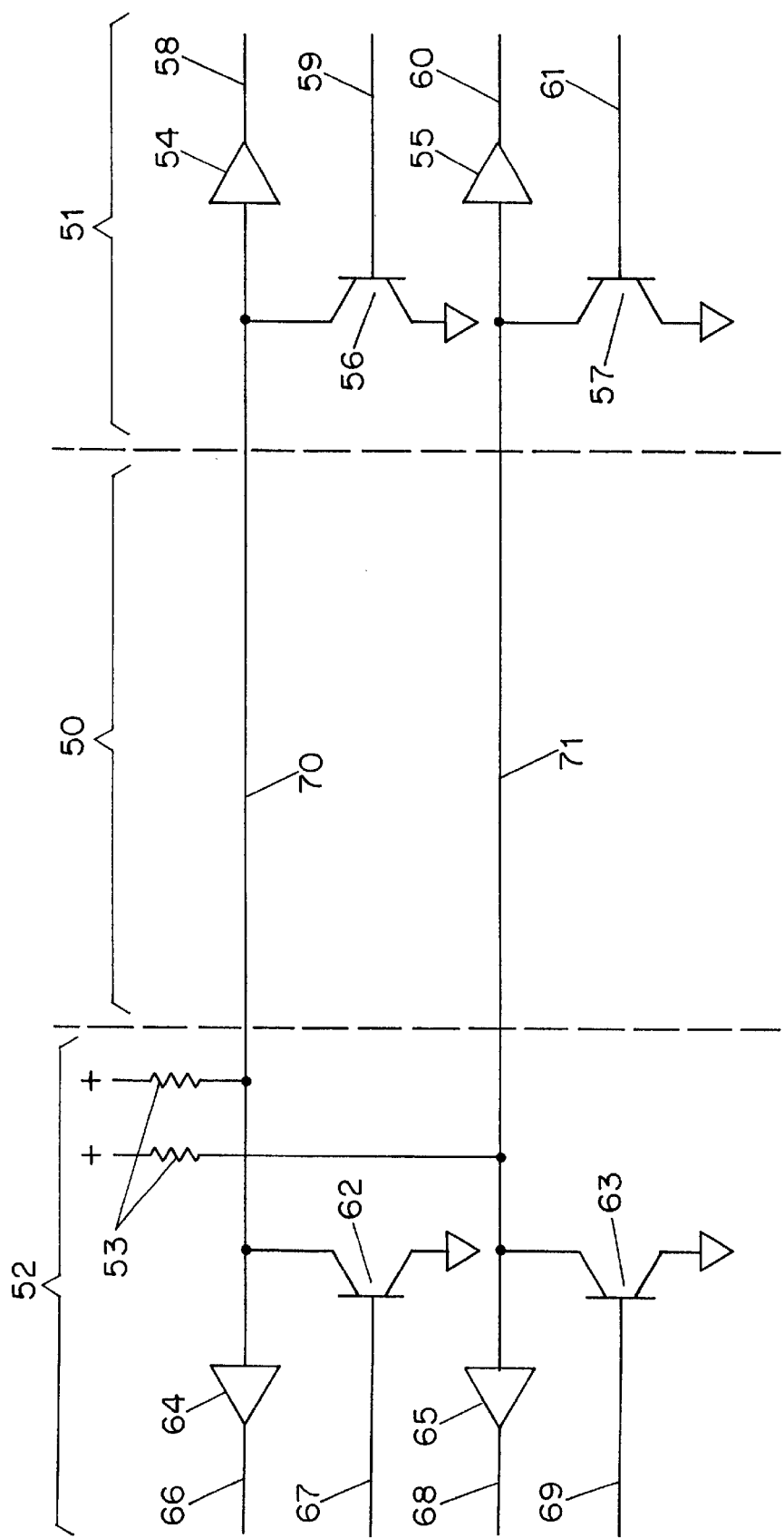
FIG. 1 is a schematic diagram of a synchronous bus system.

To describe the invention in detail, it is helpful first to characterize a typical prior-art system in which a user input device such as a keyboard communicates with the system. Turning to FIG. 1, what is shown is what is historically called a "PS/2" bus system. In this system, the bus 50 is a synchronous serial bus and there are only two devices on the bus. The devices are defined respectively as Master 52 and Slave 51, and the bus 50 connects the devices. The bus 50 is a three-wire bus, defined by a Clock line 70, a Data line 71, and a signal ground line which is omitted for clarity but is understood to provide a signal ground reference between the two devices. (Those skilled in the art appreciate that most keyboards and pointing devices are electrically connected only to the computer and not to anything else, so there need not be a concern for ground loops. Sometimes the PS/2 bus also provides power for external devices.)

Historically the user input device such as a keyboard or pointing device is termed the "Slave" and the computer is termed the "Master". The interface circuitry within the computer performing the role of the Master is historically an 8042 microcontroller integrated circuit or "chip" dedicated to the interface task, omitted for clarity in FIG. 1. The counterpart circuitry within the keyboard is also historically an 8051 or other similar microcontroller, also omitted for clarity in FIG. 1. Suitable software is loaded into these historical microcontroller chips so that the keyboard chip may perform scanning of the keyboard matrix and transmission of the corresponding scancodes over the bus 50, and the interface chip may receive the scancodes and provide the scancode information to the operating system. In historical systems, there is no premium placed on space, weight, parts count or power consumption, which permits the use of discrete 8042 chips, but it will be appreciated by those skilled in the art that it is commonplace to combine the function of the historical 8042 chip with other functions to save space, weight, parts count, and power consumption.

As just mentioned, the bus 50 connects two (and only two) devices—a Master 52 (a.k.a. Host Controller, a.k.a. 8042) and a Slave 51 (Keyboard or Mouse). The single clock line 70 is driven at each end by an open-collector/open-drain type of semiconductor driver 62, 56, and the same is true of the single data line driven by drivers 63, 57. (While the drivers are shown as bipolar transistors, other switches such as FETs could be employed.) A pullup resistor 53 is provided so that the idle state of each line is "high". (The pullup resistor 53 is shown as part of the Master device 52 but could, in other systems, be provided in the slave device 51.) Stated differently, each of the devices (master 52 and slave 53) is able to drive either of these lines 70, 71 "low" at any time. Also connected to respective ends of the bus lines 70, 17 are line receivers 64, 65, 54, 55 which are preferably Schmitt triggers for noise immunity.

The protocol between the master and slave defines that all clock signals for the data transfers are generated by the slave. As the communications are intended to be bidirectional, the protocol further defines that data signals can be generated by either the master or the slave. The protocol also defines that any transfer of data, regardless of direction, is initiated by pulling the data line low.

It will thus be appreciated that the slave device 51 transmits via lines 59 and 61, using line 59 to clock data on line 61. Similarly the master device 52 transmits via line 69, responding to clock signals received on line 66 to clock data on line 69. Reception at the slave device 51 is via lines 58 and 60, with line 58 clocking data for line 60. Reception at the master device 52 is via lines 66 and 68, with line 66 clocking data for line 68.

In the case of a transfer of data from Slave to Master, after the Slave pulls the data line low, it commences the generation of negative-going clock pulses. In this way the bits of data are clocked across the data line.

In the case of a transfer of data from Master to Slave, after the Master pulls the data line low, it waits until such time as the Slave commences the generation of negative-going clock pulses. The bits of data are clocked across the data line by the Master in response to the pulses on the clock line that are generated by the Slave.

It is necessary, of course, to consider the case of a collision when both the Master and Slave want to send data at the same time. The protocol defines that in this case, "Master sends to Slave" mode has priority. This condition is recognized by the Slave at a time when it wants to send data, but finds the Data line already "Low". The Slave is required, under the protocol, to refrain from sending data until the Master-to-Slave transfer has completed and the bus has returned to an idle or quiescent state.

A final aspect of the protocol is particularly significant. At any time before a Byte data transfer, or at any time up to the last data bit during the transfer—the Master 52 may invoke an aspect of the protocol designed to abort the data transfer, and does so by holding the Clock line 70 "Low" (minimally, it is required to hold the Clock "Low" at least for the duration of the longest possible Clock cycle—defined as ~100 uS, but there is no Maximum limitation on how long the Clock can be held "Low"). It does so via clock control line 67. The Slave device is required, under the protocol, to monitor the clock line 70 during a time when the Slave was not itself holding the clock line low. In this event, the Slave makes note that its data transmission did not succeed. The Slave is required to re-send the data Byte as soon as the Bus becomes "free" (e.g. the Clock line 70 is returned to the Idle "High" state), or at any convenient time thereafter.

Among the possible exchanges of data between Master and Slave is an exchange in which the Master sends a command to the Slave, and in which the Slave is obligated to provide a response. The protocol defines that the response must be made promptly. In the event that the Master inhibits data flow as described above by holding the clock line 70 low, the protocol implies that the Slave should attempt to resend the data as soon as the bus becomes available. In the case that the Master pulls the clock line low at any time after the first clock pulse has been asserted and up to the tenth pulse of the message byte, the Slave will have to re-transmit the byte when the bus becomes available (that is, when the clock line is released to go high again). The Master will typically elect to abort a transmission using this method if it becomes busy and is unable to process the incoming byte, or if it needs to override the data transmission from the slave in order to issue a command. In the latter case, depending on the type of command issued the slave may or may not need to re-transmit the aborted byte (if for example the command is a "reset" command the Slave has to clear its output buff and reinitialize itself). It is also important to note that according to the protocol, if the Master applies this method at the eleventh clock pulse, corresponding to the last bit of the transmitted byte, the slave is permitted to assume that the message byte has been received intact and will not attempt to transmit it.

In the system according to the invention, advantageously the Master 52 can stop its (internal) clock and go into a low-power state (for power conservation reasons) at arbitrary times, as will now be described. Before going into the stopped-clock or low-power mode, the Master checks that the serial bus is idle (defined as both Clock and Data lines being "High"). What follows next is one of two events: (1) the Master returns to normal clock operation (normal power mode); or (2) the Slave attempts to send data to the Master. In the former case, the Master is able to receive later data from the Slave just as in the prior art. In a prior-art system, however, the latter event (the slave attempting to send data at a time when the master has a stopped or very slow clock) would result in loss of data from the slave. In practical terms, a keystroke or pointing device movement could be lost.

Figure 2:
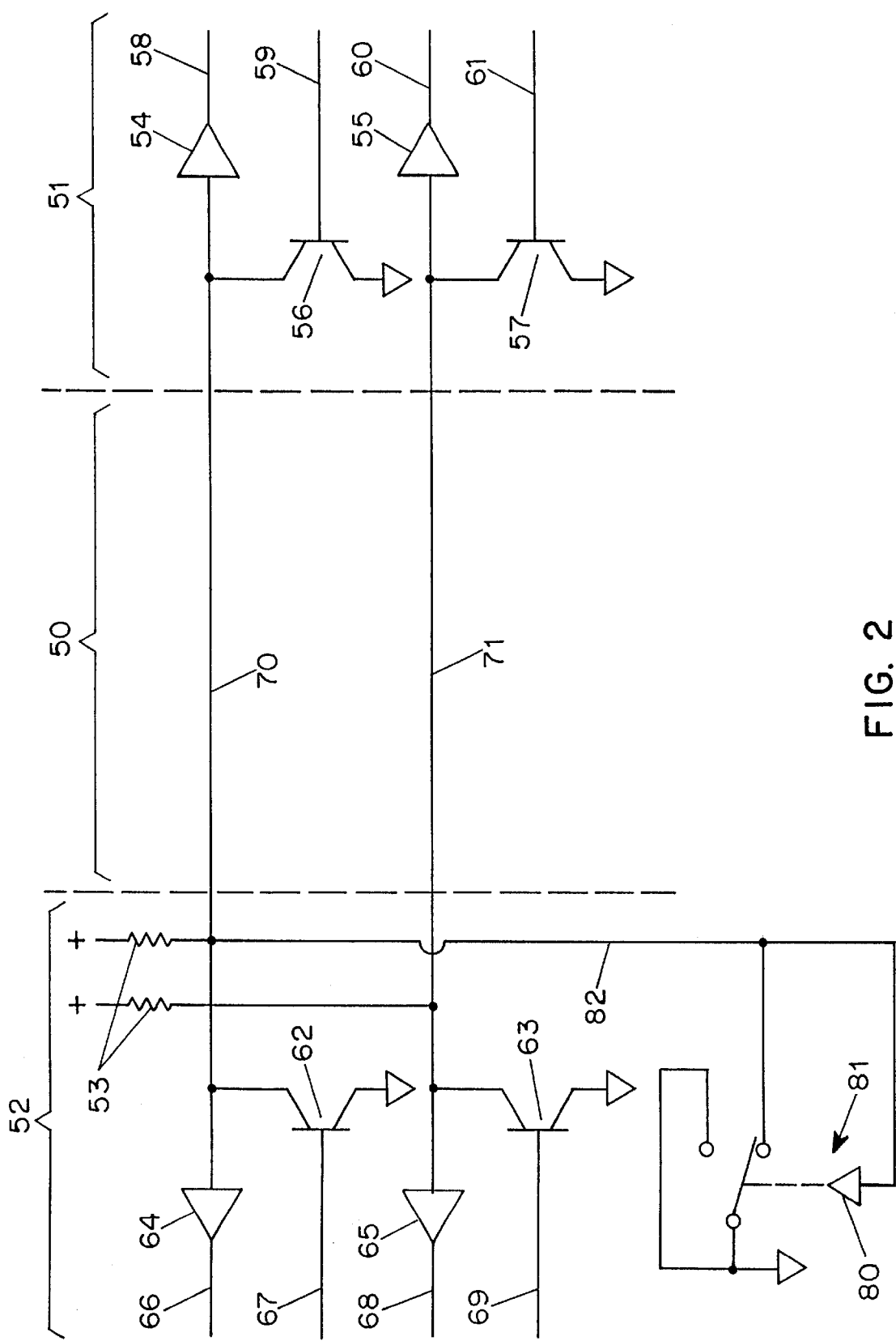
FIG. 2 is a schematic diagram of a synchronous bus system including a latch circuit according to the invention.

Turning now to FIG. 2, advantageously, in the system according to the invention, a latch circuit 81 is provided which is active when the master is in low-power mode. The latch circuit watches for the very first negative-going clock pulse (from the slave), and its configuration is such that when latched, it holds the clock line 70 low via line 82. As described above, holding the clock line 70 low prompts the slave 51 to discontinue efforts to send the data. Stated differently, the slave 51 will not conclude that it had successfully sent its data, and this prompts the slave 51 to retain a copy of its data for later resending.

The configuration of the latch 81 is such that when it is triggered, it holds the clock line 70 low. At some later time the Master 52 restarts its clock (or returns to full-power mode) and is in a position to be able to receive serial data from the slave. (The return of the Master to normal clock or normal power mode may be prompted by the latching of the clock as detected at line 66, or may happen for other reasons. In the former case, the clock line serves as an interrupt which causes a return to full-power mode.) As soon as the Master 52 is running (which in a preferred embodiment takes only a few milliseconds), the master 52 resets the Latch circuit 81 by means of line 80. This releases the Clock line 70 from the "Low" state. At some convenient time the Slave 51 will re-send the last byte data transmission.

Those skilled in the art will appreciate that there is a penalty associated with the use of the latch 81 in connection with low-power mode, namely that there may be a delay of a few milliseconds until the master's internal clock has stabilized and them aster is ready to process incoming data in real time. Experience, however, shows that this delay does not affect system performance perceptibly. If the delay is acceptable, the desirable result is that even during an interval of low-power mode, the Slave 51 can start sending data at any time, even during times when the Master 52 is unresponsive, and yet not data loss occurs.

Figure 3:
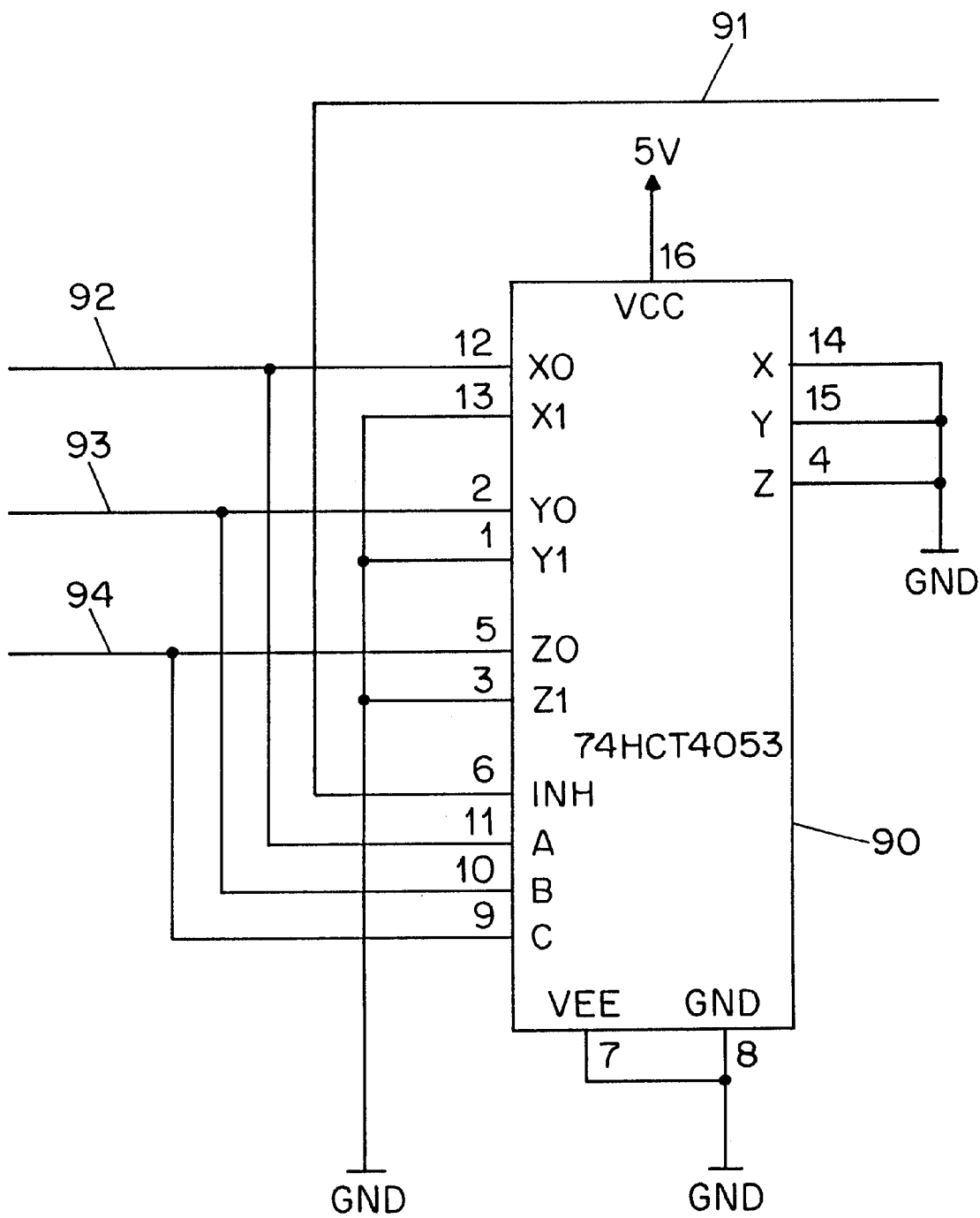
FIG. 3 is a block diagram showing a circuit conditioning three ports according to the invention.

It should be appreciated that in commercial applications it is commonplace to have a system which responds to two or more user input devices. For example there may be built-in keyboard, a connector to receive an external keyboard, and a connector to receive a mouse or other pointing device. Thus it is desirable to provide a system in which the master may transition to a low-power or clock-stopped mode, and yet may respond to two or more user inputs from two or more slave devices, all without the danger of losing user input information. Turning now to FIG. 3, what is shown is a preferred circuit which will condition three PS/2 ports (at lines 92, 93, and 94) at the same time for the Master controller. There is in principal no limit to the number of PS/2 ports one can incorporate in a single controller, only the circuit should be repeated as many times as necessary. In this embodiment the latch 90 is a 74HCT4053. The master rests the latch by means of control line 91.

Note that the assertion of the clock low signal by the Master may occur at any time during the transmission of the first ten bits of the byte message. A second implementation could consist of a counter or other similar circuit that is capable of asserting the clock line low after a predetermined number of incoming clock pulses. Another implementation uses the inhibit instead of the abort feature of the protocol and can be implemented by a ten-bit minimum length shift register and associated circuitry that will hold the clock line low after the reception of the tenth bit of the message. In this case the Slave will not have to re-transmit the byte (assumes that the byte has been received). The Master can retrieve the information of the received byte from the shift register and re-enable the bus as soon as it is ready to receive the next one. This method reduces bus traffic (re-transmissions at an extra hardware cost (shift register and associated circuitry).

What is claimed is:

1. A system comprising a master device and slave device communicatively coupled by a serial synchronous communications line, said communications line defining a clock line and a data line, each of said clock and data lines biased high, each of said master and slave having a respective clock line driver actuable to pull the clock line low, each of said master and slave having a respective data line driver actuable to pull the data line low;

said master device disposed to operate at a first power level and at a second lower power level;

said system further comprising a latch comprising a line driver actuable to pull the clock line low, said latch responsive to said master device being at said second power level, and responsive to said clock line transitioning to a low level, for actuating its line driver thereby holding the clock line low;

said latch further responsive to said master device reaching its first power level for deactuating the line driver of the latch.

2. The system of claim 1 wherein the latch and master device are further characterized in that the master device is responsive to actuation of the latch for transitioning the master device to the first power level.

3. The system of claim 1 wherein the slave devices halts transmission of data on the communications line in the event of the clock line being held low other than by the clock line driver of the slave device.

4. A system comprising a master device communicatively coupled to a serial synchronous communications line, said communications line defining a clock line and data line, each of said clock and data lines biased high, said master having a clock line driver actuable to pull the clock line low, said master having a respective data line driver actuable to pull the data line low;

said master device disposed to operate at a first power level and at a second power level;

said system further comprising a latch comprising a line driver actuable to pull the clock line low, said latch responsive to said master device being at said second power level, and responsive to said clock line transitioning to a low level, for actuating its line driver thereby holding the clock line low;

said latch further responsive to said master device reaching its first power level for deactuating the line driver of the latch.

5. The system of claim 4 wherein the latch and master device are further characterized in that the master device is responsive to actuation of the latch for transitioning the master device to the first power level.

6. A method for use in a system comprising a master device and slave device communicatively coupled by a serial synchronous communications line, said communications line defining a clock line and a data line, each of said clock and data lines biased high, each of said master and slave having a respective clock line driver actuable to pull the clock line low, each of said master and slave having a respective data line driver actuable to pull the data line low;

said master device disposed to operate at a first power level and at a second lower power level; said system further comprising a latch comprising a line driver actuable to pull the clock line low; the method comprising the steps of:

causing the master device to enter said second power level;

responding to said clock line transitioning to a low level by actuating the line driver of the latch thereby holding the clock line low;

responding to said master device reaching its first power level by deactuating the line driver of the latch.

7. The method of claim 6 further comprising the step of responding to actuating the latch by causing the master device to transition to the first power level.

8. The method claim 6 further comprising the step of responding to the event of the clock line being held low other than by the clock line driver of the slave device by halting transmission of data on the communications line by the slave device.

9. The method of claim 6 further comprising the step of responding to actuating the latch by causing the master device to transition to the first power level.

10. A method for use in a system comprising a master device communicatively coupled to a serial synchronous communications line, said communications line defining a clock line and a data line, each of said clock and data lines biased high, said master having a clock line driver actuable to pull the clock line low, said master having a respective data line driver actuable to pull the data line low; said master device disposed to operate at a first power level and at a second lower power level; said system further comprising a latch comprising a line driver actuable to pull the clock line low; the method comprising the steps of:

causing the master device to enter said second power level;

responding to said clock line transitioning to a low level by actuating the line driver of the latch thereby holding the clock line low;

responding to said master device reaching its first power level by deactuating the line driver of the latch.

11. A system comprising a master device and first and second slave devices, each slave device communicatively coupled with the master device by a respective serial synchronous communications line, each said communications line defining a clock line and a data line, each of said clock and data lines biased high, each of said master and slave having a respective clock line driver actuable to pull the respective clock line low, each of said master and slave having a respective data line driver actuable to pull the respective data line low;

said master device disposed to operate at a first power level and at a second lower power level;

said system further comprising first and second latches corresponding to respective slave devices, each said latch comprising a line driver actuable to pull a respective clock line low, each said latch responsive to said master device being at said second power level, and responsive to said respective clock line transitioning to a low level, for actuating its line driver thereby holding the respective clock line low;

each said latch further responsive to said master device reaching its first power level for deactuating the line driver of the latch.

12. The system of claim 11 wherein the latch and master device are further characterized in that the master device is responsive to actuation of each of the first and second latches for transitioning the master device to the first power level.

13. The system of claim 11 wherein each slave device halts transmission of data on its respective communications line in the event of the respective clock line being held low other than by the respective clock line driver of the slave device.

14. A system comprising a master device communicatively coupled to first and second serial synchronous communications lines, each said communications line defining a respective clock line and a respective data line, each of said clock and data lines biased high, said master having respective clock line drivers actuable to pull the respective clock lines low, said master having respective data line drivers actuable to pull the respective data lines low;

said master device disposed to operate at a first power level and at a second lower power level;

said system further comprising first and second latches corresponding to the first and second communications lines, each latch comprising a respective line driver actuable to pull the respective clock line low, each said latch responsive to said master device being at said second power level, and responsive to said respective clock line transitioning to a low level, for actuating its respective line driver thereby holding the respective clock line low;

each said latch further responsive to said master device reaching its first power level for deactuating the respective line driver of the latch.

15. The system of claim 14 wherein the latches and master device are further characterized in that the master device is responsive to actuation of each said latch for transitioning the master device to the first power level.

* * * * *